US008665351B2

(12) United States Patent
Muramatsu

(10) Patent No.: US 8,665,351 B2
(45) Date of Patent: Mar. 4, 2014

(54) IMAGE PROCESSING DEVICE, ELECTRONIC CAMERA, AND STORAGE MEDIUM STORING IMAGE PROCESSING PROGRAM

(75) Inventor: Masaru Muramatsu, Kawasaki (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 12/835,937

(22) Filed: Jul. 14, 2010

(65) Prior Publication Data
US 2011/0019023 A1 Jan. 27, 2011

(30) Foreign Application Priority Data

Jul. 23, 2009 (JP) .................................. 2009-172397
Aug. 20, 2009 (JP) .................................. 2009-190889

(51) Int. Cl.
H04N 9/64 (2006.01)
H04N 5/202 (2006.01)

(52) U.S. Cl.
USPC .......................................... 348/251; 348/254

(58) Field of Classification Search
USPC ............ 348/222.1, 243, 254, E05.034, 229.1, 348/251
See application file for complete search history.

(56) References Cited

U.S. PATENT DOCUMENTS

| 5,454,044 | A | 9/1995 | Nakajima | |
|---|---|---|---|---|
| 5,608,813 | A | 3/1997 | Nakajima | |
| 8,085,315 | B2 * | 12/2011 | Muramatsu | 348/222.1 |
| 2004/0212688 | A1 * | 10/2004 | Takano et al. | 348/218.1 |
| 2006/0119713 | A1 | 6/2006 | Deguchi et al. | |
| 2006/0221216 | A1 | 10/2006 | Hattori | |
| 2008/0002216 | A1 * | 1/2008 | Matsushima | 358/1.9 |
| 2008/0079822 | A1 | 4/2008 | Nojima | |
| 2008/0253650 | A1 | 10/2008 | Kuniba | |
| 2008/0297632 | A1 | 12/2008 | Muramatsu | |
| 2009/0002521 | A1 | 1/2009 | Muramatsu | |
| 2009/0040157 | A1 * | 2/2009 | Nishitani et al. | 345/87 |
| 2009/0040338 | A1 | 2/2009 | Muramatsu | |

(Continued)

FOREIGN PATENT DOCUMENTS

JP  B2-2663189   10/1997
JP  A-2004-104464  4/2004

(Continued)

OTHER PUBLICATIONS

Japanese Office Action issued in Japanese Application No. 2009-172397 dated Apr. 26, 2011 (with translation).

(Continued)

Primary Examiner — Lin Ye
Assistant Examiner — Euel Cowan
(74) Attorney, Agent, or Firm — Oliff, PLC

(57) ABSTRACT

An obtaining unit obtains image data. An image processing unit performs, on the image data, image processing including gradation conversion processing according to an input/output characteristic defined by a gradation curve formed only of an exponential component represented by $y=k \cdot x^n$, where x is an input, y is an output, and k, n are coefficients. A calculating unit performs calculation for correction to improve lightness of dark area gradation of the image data. A correcting unit performs correction to improve lightness of the dark area gradation of the image data on which the image processing is performed by the image processing unit based on a calculation result of the calculating unit. Accordingly, image processing capable of generating a preferred image can be performed when various types of image processing are performed before and after compression of the dark area gradation.

10 Claims, 13 Drawing Sheets

(56) References Cited

U.S. PATENT DOCUMENTS

2009/0041350 A1* 2/2009 Utagawa et al. ............ 382/169
2009/0256866 A1* 10/2009 Noda ........................... 345/690
2010/0034458 A1* 2/2010 Tada ............................ 382/167

FOREIGN PATENT DOCUMENTS

| JP | A-2005-215353 | 8/2005 |
| JP | A-2006-287323 | 10/2006 |
| JP | A-2007-180851 | 7/2007 |
| JP | 2007-311895 * | 11/2007 |
| JP | A-2007-311895 | 11/2007 |
| JP | A-2008-109629 | 5/2008 |
| JP | A-2008-258828 | 10/2008 |
| JP | A-2008-301371 | 12/2008 |
| JP | A-2009-44208 | 2/2009 |
| JP | A-2009-044221 | 2/2009 |
| WO | WO 2006/137361 A1 | 12/2006 |

OTHER PUBLICATIONS

Japanese Office Action issued in Japanese Application No. 2009-190889 dated Jul. 19, 2011 (with translation).
Dec. 13, 2011, Office Action issued in Japanese Patent Application No. 2009-172397 (with translation).
Jan. 29, 2013 Office Action issued in Japanese Application No. 2012-028498 (with English Translation).
Nov. 26, 2013 Office Action issued in Japanese Patent Application No. 2012-028498 w/translation.

* cited by examiner

IMAGE PROCESSING DEVICE, ELECTRONIC CAMERA, AND STORAGE MEDIUM STORING IMAGE PROCESSING PROGRAM

CROSS REFERENCE TO RELATED APPLICATIONS

This application is based upon and claims the benefit of priorities from Japanese Patent Application Nos. 2009-172397 (filed on Jul. 23, 2009) and 2009-190889 (filed on Aug. 20, 2009) the entire contents of which are incorporated herein by reference.

BACKGROUND

1. Field

The present application relates to an image processing device, an electronic camera, and an image processing program storage medium.

2. Description of the Related Art

Conventionally, there has been known a phenomenon that dark area gradation of image data is blacked out when shooting a subject having a large difference in brightness. Accordingly, inventions of Patent Publication No. 2663189 compress the gradation by increasing gain of the dark area gradation so as to improve black saturation of the dark area gradation.

Incidentally, various types of image processing are performed before and after the above-described compression of dark area gradation. For example, general gradation conversion processing, processing to achieve the gradation characteristics corresponding to viewing conditions (such as brightness of the surrounding) of the output destination, and the like are performed.

In such a situation, it is possible that preferred gradation characteristics cannot be achieved in relation with previous and/or subsequent processing, or even that a change in hue, chroma, and contrast occurs because the dark area turns to normal brightness.

SUMMARY

Accordingly, a proposition is to perform image processing capable of generating a preferred image when various types of image processing are performed before and after compression of dark area gradation.

An image processing device according to one aspect of embodiment includes an obtaining unit obtaining image data, an image processing unit performing, on the image data, image processing including gradation conversion processing according to an input/output characteristic defined by a gradation curve formed only of an exponential component represented by $y=k \cdot x^n$, where x is an input, y is an output, and k, n are coefficients, a calculating unit performing calculation for correction to improve lightness of dark area gradation of the image data, and a correcting unit performing correction to improve lightness of dark area gradation of the image data on which the image processing is performed by the image processing unit based on a calculation result of the calculating unit.

In addition, the correcting unit may perform correction to improve lightness of the dark area gradation on luminance image data and color difference image data based on the image data subjected to the image processing by the image processing unit.

Further, there may be included a recording unit associating and recording information indicating the calculation result of the calculating unit and the image data corrected by the correcting unit.

Further, an electronic camera including an imaging unit imaging a subject image and generating image data, and an image processing device having any one of the above-described configurations, in which the obtaining unit obtains the image data from the imaging unit, is also effective as a specific aspect of the present embodiment.

An image processing device according to another aspect of embodiment includes an obtaining unit obtaining image data, a first image processing unit performing, on the image data, image processing including gradation conversion processing according to an input/output characteristic defined by a gradation curve formed only of an exponential component represented by $y=x^n$, where x is an input and y is an output, a calculating unit performing calculation for correction to improve lightness of dark area gradation of the image data, a correcting unit performing correction to improve lightness of the dark area gradation of the image data on which the image processing is performed by the first image processing unit based on a calculation result of the calculating unit, and a second image processing unit performing on the image data corrected by the correcting unit gradation conversion processing according to an input/output characteristic defined by a gradation curve different from the gradation curve in the first image processing unit.

In addition, the correcting unit may perform correction to improve lightness of the dark area gradation on each of R image data, G image data, and B image data based on the image data obtained by the obtaining unit.

Further, the correcting unit may perform correction to improve lightness of the dark area gradation on each of Y image data, Cb image data, and Cr image data based on the image data obtained by the obtaining unit.

The second image processing unit may perform the gradation conversion processing only on Y image data on which correction to improve lightness of the dark area gradation is performed by the correcting unit.

Further, an electronic camera including an imaging unit imaging a subject image and generating image data, and an image processing device having any one of the above-described configurations, in which the obtaining unit obtains the image data from the imaging unit, is also effective as a specific aspect of the present embodiment.

An image processing device according to still another aspect of embodiment includes an obtaining unit obtaining image data, a first image processing unit performing on the image data image processing including gradation conversion processing according to an input/output characteristic defined by a gradation curve with at least a middle tone and a darker part being formed only of an exponential component represented by $y=x^n$, where x is an input and y is an output, a calculating unit performing calculation for correction to improve lightness of dark area gradation of the image data, a correcting unit performing correction to improve lightness of the dark area gradation of the image data on which the image processing is performed by the first image processing unit based on a calculation result by the calculating unit, and a second image processing unit performing on the image data corrected by the correcting unit gradation conversion processing according to an input/output characteristic defined by a gradation curve different from the gradation curve in the first image processing unit.

Moreover, one representing the above-described configurations related to the embodiment by converting them into a storage medium storing an image processing program for achieving image processing on image data as an object to be processed in a computer is also effective as a specific aspect of the present embodiment.

DETAILED DESCRIPTION OF THE EMBODIMENTS

[Embodiment]

An embodiment of the present invention will be described below using the drawings. In the embodiment below, a description will be given using a single lens reflex electronic camera as an example of an electronic camera of the present invention.

Figure 1:
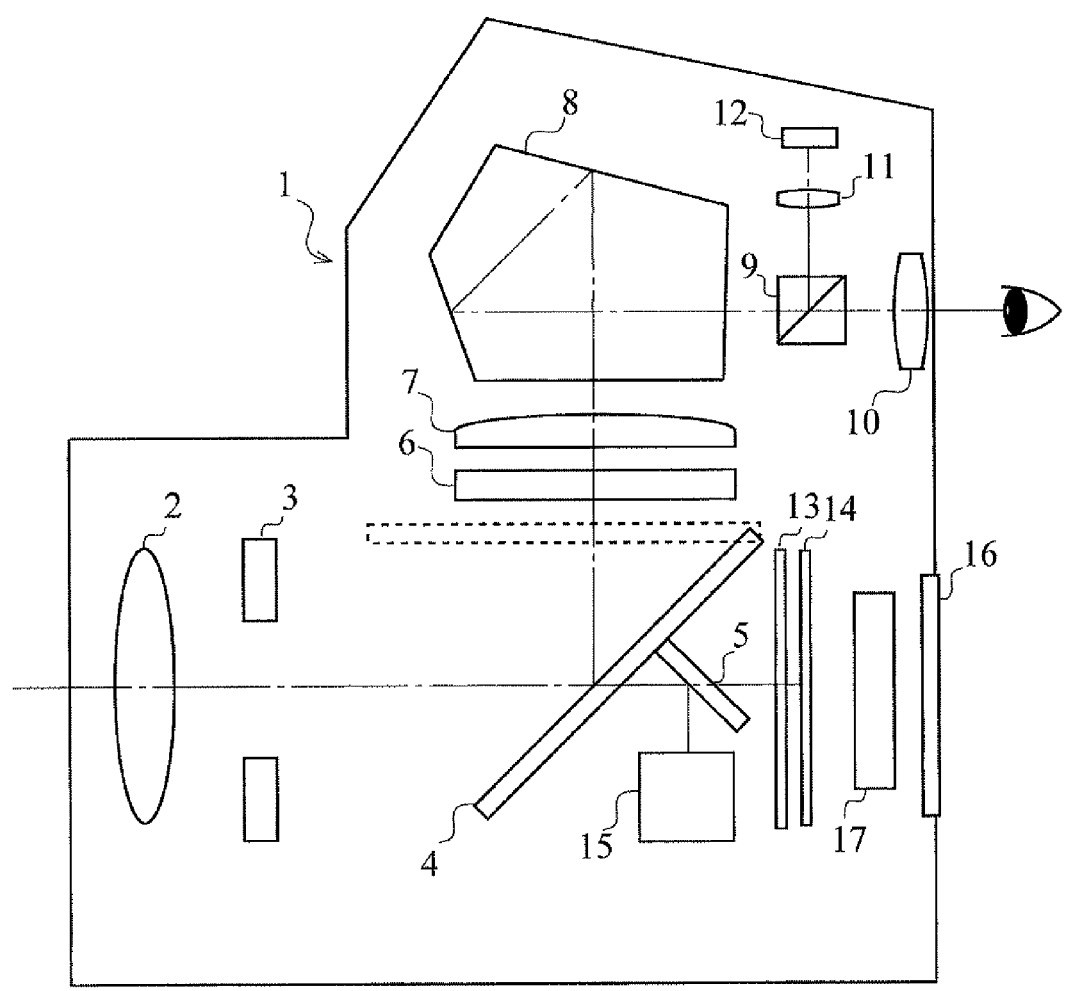
FIG. 1 is a diagram illustrating a configuration of an electronic camera 1 of an embodiment.

FIG. 1 is a diagram illustrating a structure of an electronic camera 1 of the embodiment. As illustrated in FIG. 1, the electronic camera 1 has a photographic lens 2, an aperture diaphragm 3, a quick return mirror 4, a sub mirror 5, a diffusing screen 6, a condenser lens 7, a pentaprism 8, a beam splitter 9, an eyepiece lens 10, an imaging lens 11, a photometry sensor 12, a shutter 13, an imaging sensor 14, and a focus detecting part 15. The imaging sensor 14 is a semiconductor device such as CCD (Charge Coupled Device) or CMOS (Complementary Metal Oxide Semiconductor) for example. The focus detecting part 15 performs a focus detection of phase difference method to detect the focus state of the photographic lens 2

In addition, the electronic camera 1 further has a monitor 16 such as a liquid crystal monitor displaying an image generated by imaging, and so on, and a controlling unit 17 controlling each part of the electronic camera. The controlling unit 17 has a not-illustrated memory inside, and records a program for controlling each part of the electronic camera in advance.

During a non-photographing time, that is, when photographing is not performed, the quick return mirror 4 is arranged at an angle of 45° as illustrated in FIG. 1. Then an optical flux which passed through the photographic lens 2 and the aperture diaphragm 3 is reflected on the quick return mirror 4, and is guided to the eyepiece lens 10 via the diffusing screen 6, the condenser lens 7, the pentaprism 8, and the beam splitter 9. The user checks the composition by visually observing the image of a subject via the eyepiece lens 10. On the other hand, an optical flux divided upward by the beam splitter 9 is re-imaged on the imaging plane of the photometry sensor 12 via the imaging lens 11. Further, an optical flux which penetrated the quick return mirror 4 is guided to the focus detecting part 15 via the sub mirror 5.

On the other hand, when photographing is performed, the quick return mirror 4 retreats to the position shown by a dashed line and the shutter 13 is released, and the optical flux from the photographic lens 2 is guided to the imaging sensor 14.

Figure 2:
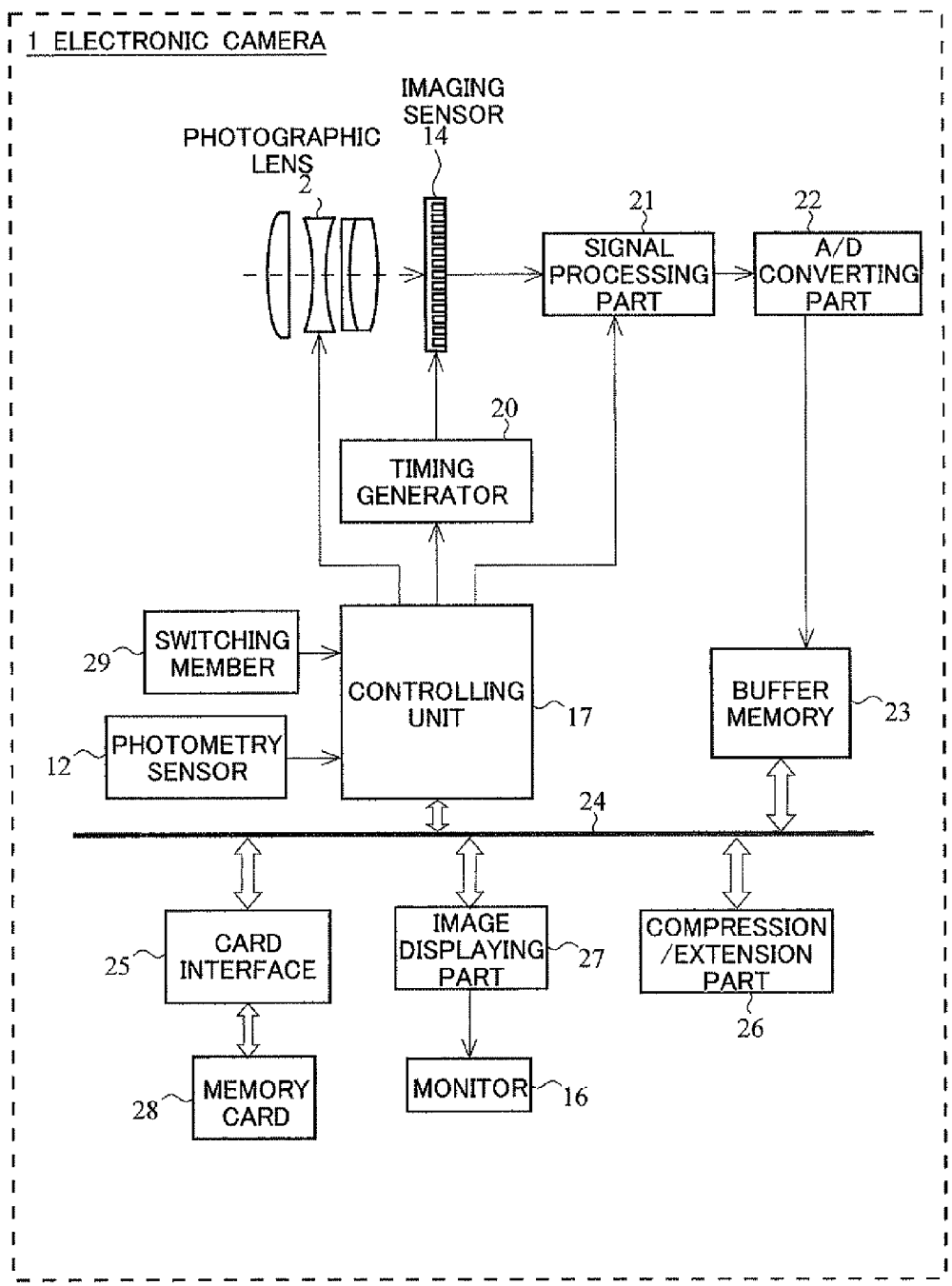
FIG. 2 is a functional block diagram of the electronic camera 1 of the embodiment.

FIG. 2 is a functional block diagram of the electronic camera 1 of the embodiment. As illustrated in FIG. 2, the electronic camera 1 has a timing generator 20, a signal processing part 21, an A/D converting part 22, a buffer memory 23, a bus 24, a card interface 25, a compression/extension part 26, and an image displaying part 27 in addition to the structure in FIG. 1. The timing generator 20 supplies output pulses to the imaging sensor 14. Further, image data generated in the imaging sensor 14 are stored temporarily in the buffer memory 23 via the signal processing part 21 (including a gain adjusting part corresponding to imaging sensitivity) and the A/D converting part 22. The buffer memory 23 is coupled to the bus 24. The card interface 25, the controlling unit 17 described with FIG. 1, the compression/extension part 26, and the image displaying part 27 are coupled to this bus 24. The card interface 25 is coupled to a detachable memory card 28 to record image data in the memory card 28. Further, a switching member 29 (including a not-illustrated release button and so on) of the electronic camera 1, the timing generator 20, and the photometry sensor 12 are coupled to the controlling unit 17. Moreover, the image displaying part 27 displays an image and the like on the monitor 16 provided on a rear side of the electronic camera 1.

Further, the electronic camera 1 has a plurality of photographing modes defined in advance. The plurality of photographing modes include, for example, a manual mode, a full-auto mode, a person photographing mode (portrait mode or the like), and other modes (a scenery mode, a close-up mode, a nightscape mode, and so on). These photographing modes are selected in advance by the user via the switching member 29.

Further, the electronic camera 1 has a scene referred mode to generate a scene-referred image. A scene-referred image is one type of image of a "device-independent color space" defined by the International Color Consortium (abbreviated ICC) or the like in the technology of color management system (abbreviated CMS). The "device-independent color space" includes a "scene-referred" color space corresponding to an input system for taking in a scene as it is, and an "output-referred" color space corresponding to an output system and depending on preferred reproduction in media and output. In the above-described scene-referred mode, the electronic camera 1 generates such a scene-referred image.

Note that the scene-referred mode may be set by a user operation via the switching member 29 or may be set automatically by the controlling unit 17. For example, the controlling unit 17 may set the scene-referred mode in conjunction with the above-described photographing mode, or may set the scene-referred mode corresponding to a subject recognition result or the like.

Operations for photographing in a state that the scene-referred mode is set in the electronic camera 1 having the above-described structure will be described using a flowchart illustrated in FIG. 3.

In step S1, the controlling unit 17 judges whether or not a start of photographing is instructed by the user via the switching member 29. When judged that the start of photographing is instructed, the controlling unit 17 then proceeds to step S2.

In step S2, the controlling unit 17 controls each part of the electronic camera to image a subject image by the imaging sensor 14 and generates image data. The image data generated by the imaging sensor 14 are stored temporarily in the buffer memory 23 via the signal processing part 21 and the A/D converting part 22.

In step S3, the controlling unit 17 reads the image data from the buffer memory 23 and performs normal image processing. The normal image processing is white balance adjustment, interpolation processing, color tone correction processing, and/or the like. Specific methods of these processing are similar to publicly known techniques, and thus descriptions of them are omitted.

In step S4, the controlling unit 17 performs color space conversion processing to the image data subjected to the image processing in step S3. The color space conversion processing is performed by following equation 1 to equation 3.

$$Rm[x,y]=mx11 \cdot Ri[x,y]+mx12 \cdot Gi[x,y]+mx13 \cdot Bi[x,y] \quad \text{(equation 1)}$$

$$Gm[x,y]=mx21 \cdot Ri[x,y]+mx22 \cdot Gi[x,y]+mx23 \cdot Bi[x,y] \quad \text{(equation 2)}$$

$$Bm[x,y]=mx31 \cdot Ri[x,y]+mx32 \cdot Gi[x,y]+mx33 \cdot Bi[x,y] \quad \text{(equation 3)}$$

Note that Ri[x,y], Gi[x,y], and Bi[x,y] in equation 1 to equation 3 each denote image data of an RGB image. Further, mx11 to mx33 are predetermined coefficients for conversion into a color space of sRGB, for example.

In step S5, the controlling unit 17 performs gradation conversion processing on the image data subjected to the color space conversion processing in step S4. The gradation conversion processing is performed by following equation 4 to equation 6.

$$Rg[x,y]=Gm1[Rm[x,y]] \quad \text{(equation 4)}$$

$$Gg[x,y]=Gm1[Gm[x,y]] \quad \text{(equation 5)}$$

$$Bg[x,y]=Gm1[Bm[x,y]] \quad \text{(equation 6)}$$

Figure 4:
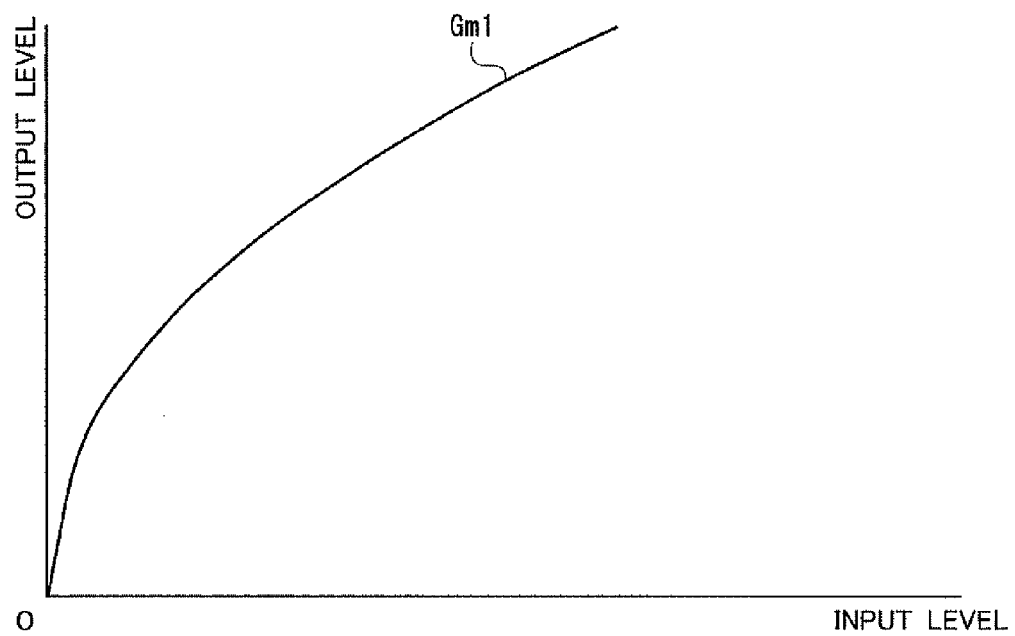
FIG. 4 is a diagram describing a gradation curve.

Note that Gm1 in equation 4 to equation 6 corresponds to, for example, a gradation curve illustrated in FIG. 4. The gradation curve Gm1 is a gradation curve with an exponent of approximately 1/2.2 as illustrated in FIG. 4.

In step S6, the controlling unit 17 performs gradation compression processing on the image data subjected to the gradation conversion processing in step S5.

The controlling unit 17 first performs a low-pass operation on the image data subjected to the gradation conversion processing in step S5. The low-pass operation is performed by following equation 7 and equation 8.

$$Y[x,y] = kr \cdot Rg[x,y] + kg \cdot Gg[x,y] + kb \cdot Bg[x,y] \quad \text{(equation 7)}$$

$$LY[x,y] = \sum_{i=-d}^{d} \sum_{j=-d}^{d} \left( Y[x+i, y+j] \cdot Lpw\left((i^2 + j^2)^{1/2}\right) \right) \quad \text{(equation 8)}$$

Note that kr, kg, kb in equation 7 are predetermined coefficients. With equation 7, a Y image out of YCbCr images is obtained from an sRGB image. Further, Lpw in equation 8 is a low-pass filter around pixels of interest, and this low-pass filter has a characteristic illustrated in FIG. 5. Then, from equation 8, image data of an LY image which is a low-pass image are generated from the Y image. Incidentally, the low-pass image is an example of a blurred image. Any other low-pass filter may be used to generate the low-pass image, or a method other than low-pass processing may be used to generate the blurred image.

Next, the controlling unit 17 performs gradation compression processing. The gradation compression processing is performed by following equation 9 to equation 12.

$$gmp[x,y]=fg(LY[x,y]) \quad \text{(equation 9)}$$

$$Rc[x,y]=Rg[x,y] \cdot gmp[x,y] \quad \text{(equation 10)}$$

$$Gc[x,y]=Gg[x,y] \cdot gmp[x,y] \quad \text{(equation 11)}$$

$$Bc[x,y]=Bg[x,y] \cdot gmp[x,y] \quad \text{(equation 12)}$$

Figure 6:
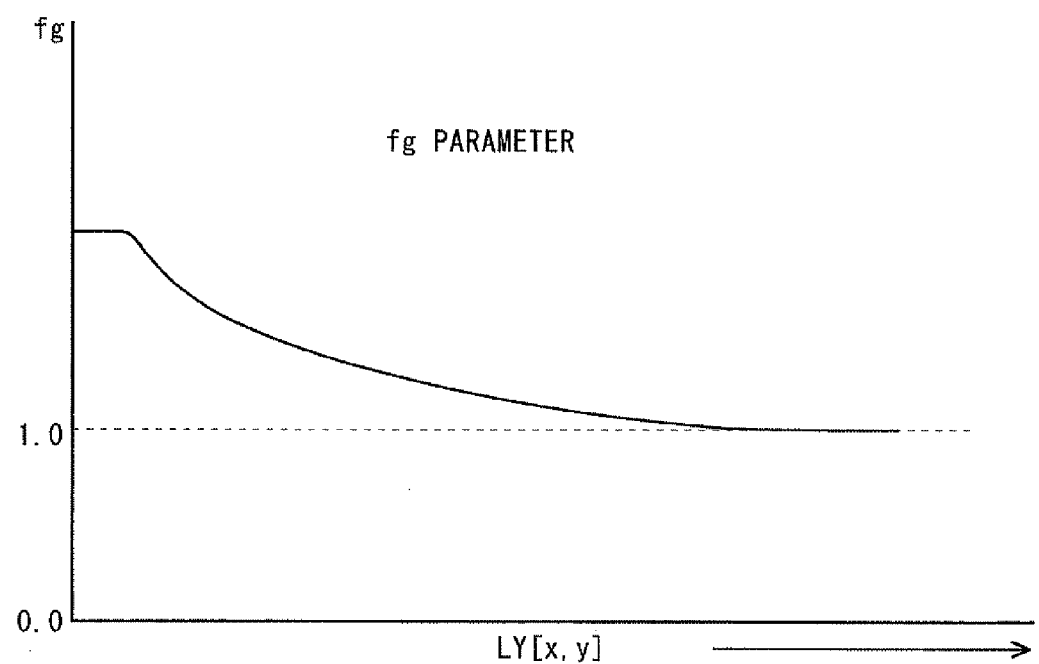
FIG. 6 is a diagram illustrating a parameter fg of gradation compression.

Note that fg in equation 9 is a parameter for gradation compression. FIG. 6 is a diagram illustrating the parameter fg for gradation compression. The parameter fg has a gain corresponding to image data of the LY image, as illustrated in FIG. 6. The smaller the image data of the LY image (darker the range of the vicinity including processed pixels), the larger the parameter fg. Conversely, the larger the image data of the LY image (brighter the range of the vicinity including processed pixels), the closer the parameter fg to 1.

In step S7, the controlling unit 17 records the image data subjected to the gradation compression processing in step S6 as the scene referred image in the memory card 28 via the card interface 25, and finishes the series of processing. In addition, before the image data are recorded in the memory card 28, image compression processing (such as JPEG compression processing) may be performed as necessary via the compression/extension part 26.

Moreover, when recording the image data subjected to the gradation compression processing, the controlling unit 17 may record gmp shown in equation 9 together with the image data as a gain map. For example, when the gain map is recorded as collateral information of the image data subjected to the gradation compression processing, image data before gradation compression (Rg, Gg, Bg shown in equation 4 to equation 6) can be created based on the gain map when reading the image data.

Processing to create image data before gradation compression from the image data subjected to the gradation compression processing is performed by following equation 13 to equation 15.

$$Rg[x,y]=Rc[x,y]/gmp[x,y] \quad \text{(equation 13)}$$

$$Gg[x,y]=Gc[x,y]/gmp[x,y] \quad \text{(equation 14)}$$

$$Bg[x,y]=Bc[x,y]/gmp[x,y] \quad \text{(equation 15)}$$

By the operations of equation 13 to equation 15, it is possible to selectively output image data after gradation compression and image data before gradation compression as the scene referred image when outputting image data.

As described above, according to this embodiment, image processing including the gradation conversion processing complying to the input/output characteristic defined by the gradation curve formed only of an exponential component represented by $y=k \cdot x^n$ (where x is an input, y is an output, and k, n are coefficients) is performed on image data, and correction is performed to improve the lightness of dark area gradation of the image data to which the image processing is performed. Conventionally, when correction to improve the lightness of dark area gradation is performed after gradation conversion processing using what is called an S-shaped gradation curve or the like, there has been a problem that a hue rotation or chroma change occurs locally due to the S-shaped gradation curve. According to this embodiment, it is possible to inhibit occurrence of such a hue rotation or chroma change. Therefore, when outputting image data, preferred image processing can be performed in a manner that it is possible to correspond to achieving preferred gradation characteristics according to viewing conditions.

Further, according to this embodiment, information indicating a calculation result for correction to improve the lightness of dark area gradation and image data on which the above-described correction is performed are recorded in an associated manner. Therefore, using the associated information, an image before correction to improve the lightness of dark area gradation is performed can be obtained easily as the scene-referred image.

A modification example of the above-described embodiment will be described below using drawings.

This modification example is to record a YCbCr image as the scene-referred image.

Operations for photographing when the YCbCr image is recorded as the scene-referred image will be described using the flowchart illustrated in FIG. 7.

Figure 3:
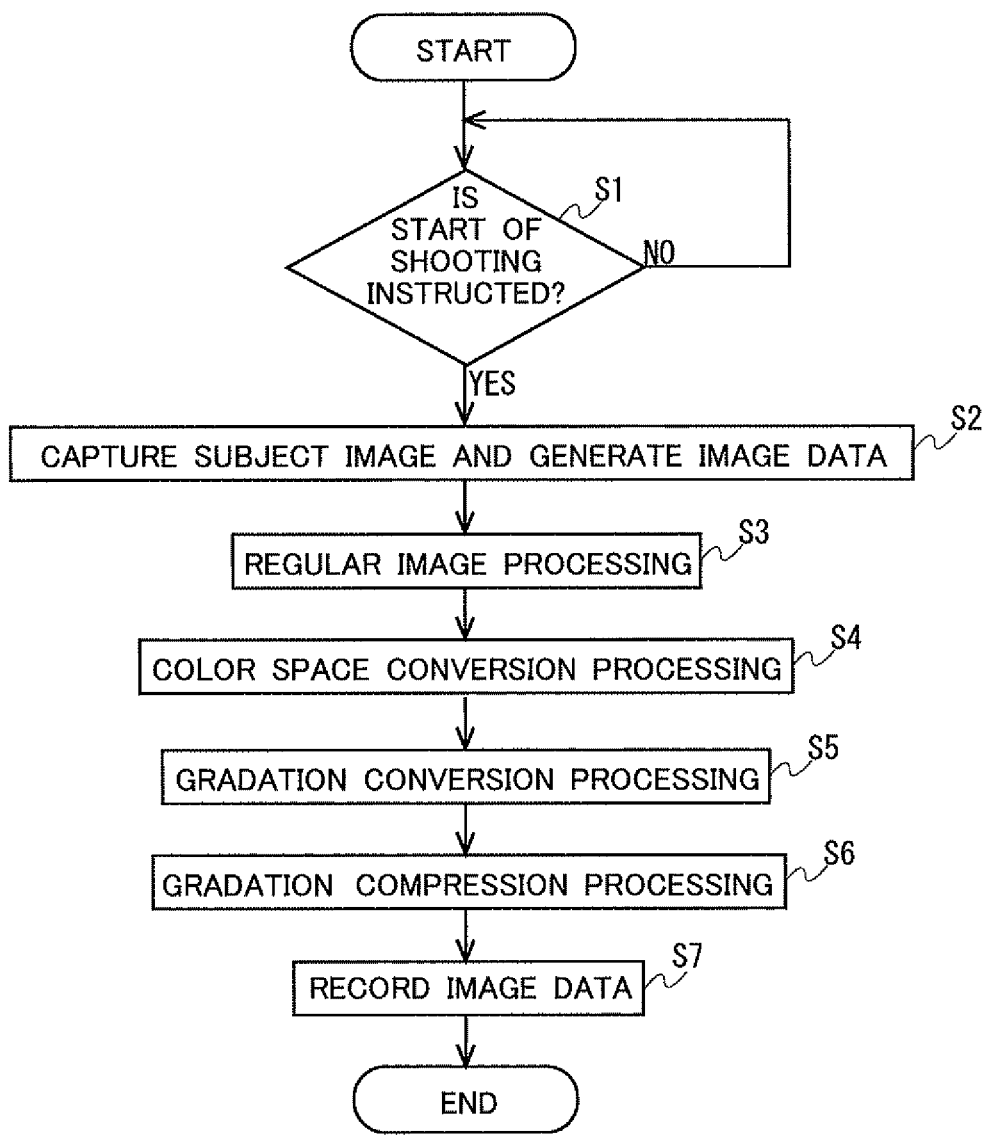
FIG. 3 is a flowchart illustrating operations for photographing in the electronic camera 1 of the embodiment.

From step S11 to step S15, the controlling unit 17 performs processing similar to that from step S1 to step S5 of FIG. 3 of the above-described embodiment.

In step S16, the controlling unit 17 performs gradation compression processing on the image data subjected to the gradation conversion processing in step S15.

The controlling unit 17 first performs a low-pass operation on the image data subjected to the gradation conversion processing in step S14. The low-pass operation is performed by following equation 16 to equation 19.

$$Y[x, y] = my11 \cdot Rg[x, y] + my12 \cdot Gg[x, y] + my13 \cdot Bg[x, y] \quad \text{(equation 16)}$$

$$Cb[x, y] = \\ my21 \cdot Rg[x, y] + my22 \cdot Gg[x, y] + my23 \cdot Bg[x, y] \quad \text{(equation 17)}$$

$$Cr[x, y] = \\ my31 \cdot Rg[x, y] + my32 \cdot Gg[x, y] + my33 \cdot Bg[x, y] \quad \text{(equation 18)}$$

$$LY[x, y] = \sum_{i=-d}^{d} \sum_{j=-d}^{d} \left( Y[x+i, y+j] \cdot Lpw\left((i^2 + j^2)^{1/2}\right) \right) \quad \text{(equation 19)}$$

Note that each of my11 to my33 in equation 16 to equation 18 is a predetermined coefficient. With equation 16 to equation 18, an sRGB image is converted into the YCbCr image. Further, with equation 19, image data of an LY image as a low-pass image are generated from the YCbCr image. In addition, the LPW in equation 19 is a low-pass filter similar to the one described in step S6 of FIG. 3 of the above-described embodiment. Incidentally, the low-pass image is an example of a blurred image. Any other low-pass filter may be used to generate the blurred image, or a method other than low-pass processing may be used to generate the blurred image.

Next, the controlling unit 17 performs gradation compression processing. The gradation compression processing is performed by following equation 20 to equation 23.

$$gmp[x,y] = fg(LY[x,y]) \quad \text{(equation 20)}$$

$$Yc[x,y] = Y[x,y] \cdot gmp[x,y] \quad \text{(equation 21)}$$

$$Cbc[x,y] = Cb[x,y] \cdot gmp[x,y] \quad \text{(equation 22)}$$

$$Crc[x,y] = Cr[x,y] \cdot gmp[x,y] \quad \text{(equation 23)}$$

Note that fg in equation 20 is a parameter for gradation compression similar to that described in step S6 of FIG. 3 of the above-described embodiment.

In step S18, the controlling unit 17 records the image data subjected to the gradation compression processing in step S17 as the scene-referred image in the memory card 28 via the card interface 25, and finishes the series of processing. In addition, before the image data are recorded in the memory card 28, image compression processing (such as JPEG compression processing) may be performed as necessary via the compression/extension part 26.

Moreover, when recording the image data subjected to the gradation compression processing, the controlling unit 17 may record gmp shown in equation 20 together with the image data as a gain map. For example, when the gain map is recorded as collateral information of the image data subjected to the gradation compression processing, image data before gradation compression (Y, Cb, Cr shown in equation 16 to equation 18) can be created based on the gain map when reading the image data.

Processing to create image data before gradation compression from the image data subjected to the gradation compression processing is performed by following equation 24 to equation 26.

$$Y[x,y] = Yc[x,y]/gmp[x,y] \quad \text{(equation 24)}$$

$$Cb[x,y] = Cbc[x,y]/gmp[x,y] \quad \text{(equation 25)}$$

$$Cr[x,y] = Crc[x,y]/gmp[x,y] \quad \text{(equation 26)}$$

By the operations of equation 24 to equation 26, it is possible to selectively output image data after gradation compression and image data before gradation compression as the scene referred image when outputting image data.

As described above, according to this modification example, correction to improve the lightness of dark area gradation is performed on luminance image data and color difference image data. Therefore, effects similar to the above-described embodiment can be obtained.

Figure 7:
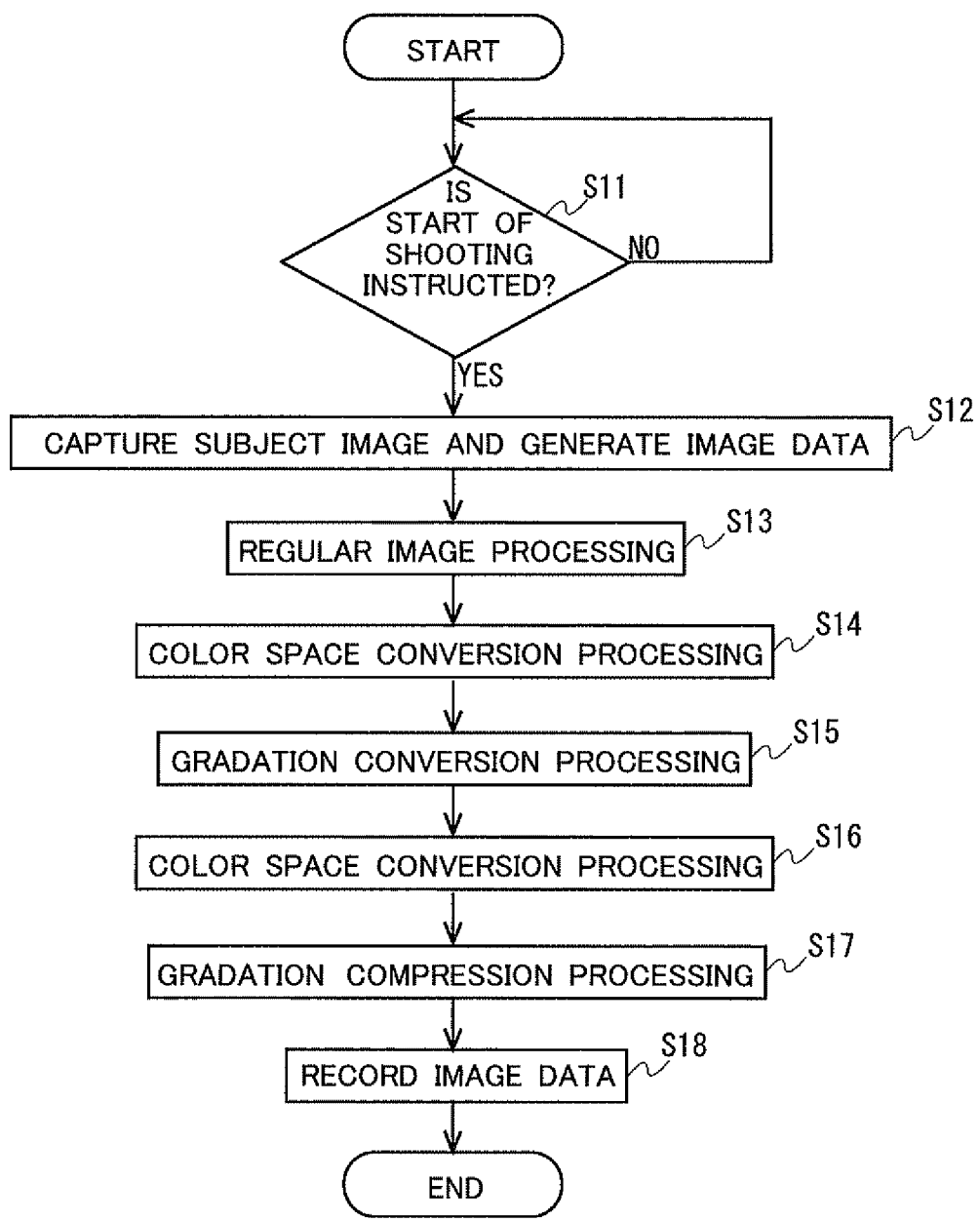
FIG. 7 is a flowchart illustrating operations for photographing in the electronic camera 1 of the embodiment.

Note that in the above-described embodiment and modification example, it is exemplified that the gradation conversion processing is performed using the gradation curve Gm1 illustrated in FIG. 4 (step S5 in FIG. 3 and step S15 in FIG. 7). However, the present invention is not limited to this example. A gradation curve other than the gradation curve Gm1 illustrated in FIG. 4 can be used to obtain the same effects as those of the present invention, as long as it is a gradation curve formed only of an exponential component represented by $y = k \cdot x^n$ (where x is an input, y is an output, and k, n are coefficients). Although the gradation curve Gm1 with an exponent of approximately 1/2.2 based on monitor gamma in the sRGB color space is exemplified in FIG. 4, it may be a gradation curve with an exponent of 1/2 for example.

Further, in the above-described embodiment and modification example, it is exemplified that the gain map is recorded together with the image data when the image data subjected to the gradation compression processing are recorded. However, it may be configured that the gain map is recorded together with image data before being subjected to gradation compression processing, and the gradation compression processing is performed at the time of reading the image data, or the like.

Further, in the above-described embodiment and modification example, the sRGB color space is exemplified as the color space of image data to be recorded, but the present invention is not limited to this example. For example, it may be a color space such as AdobeRGB.

[Another Embodiment]

Another embodiment of the present invention will be described below using the drawings. In the embodiment below, as an example of the electronic camera of the present invention, a description will be given using the single lens reflex electronic camera (see FIG. 1 and FIG. 2) described in the above-described embodiment.

Operations for photographing in the electronic camera 1 of this embodiment will be described using a flowchart illustrated in FIG. 8.

In step S21, the controlling unit 17 judges whether or not a start of photographing is instructed by the user via the switching member 29. When judged that the start of photographing is instructed, the controlling unit 17 then proceeds to step S22.

In step S22, the controlling unit 17 controls each part of the electronic camera to image a subject image by the imaging sensor 14 and generates image data. The image data generated by the imaging sensor 14 are stored temporarily in the buffer memory 23 via the signal processing part 21 and the A/D converting part 22.

In step S23, the controlling unit 17 reads the image data from the buffer memory 23 and performs normal image processing. The normal image processing is white balance adjustment, interpolation processing, color tone correction processing, and/or the like. Specific methods of these processing are similar to publicly known techniques, and thus descriptions of them are omitted.

In step S24, the controlling unit 17 performs color space conversion processing to the image data subjected to the image processing in step S23. The color space conversion processing is performed by following equation 27 to equation 29.

$$Rm[x,y]=mx11 \cdot Ri[x,y]+mx12 \cdot Gi[x,y]+mx13 \cdot Bi[x,y] \quad \text{(equation 27)}$$

$$Gm[x,y]=mx21 \cdot Ri[x,y]+mx22 \cdot Gi[x,y]+mx23 \cdot Bi[x,y] \quad \text{(equation 28)}$$

$$Bm[x,y]=mx31 \cdot Ri[x,y]+mx32 \cdot Gi[x,y]+mx33 \cdot Bi[x,y] \quad \text{(equation 29)}$$

Note that Ri[x,y], Gi[x,y], and Bi[x,y] in equation 27 to equation 29 each denote image data of an RGB image, and each of mx11 to mx33 is a predetermined coefficient.

In step S25, the controlling unit 17 performs first gradation conversion processing on the image data subjected to the color space conversion processing in step S24. The first gradation conversion processing is performed by following equation 30 to equation 32.

$$Rg[x,y]=Gm1[Rm[x,y]] \quad \text{(equation 30)}$$

$$Gg[x,y]=Gm1[Gm[x,y]] \quad \text{(equation 31)}$$

$$Bg[x,y]=Gm1[Bm[x,y]] \quad \text{(equation 32)}$$

Figure 9:
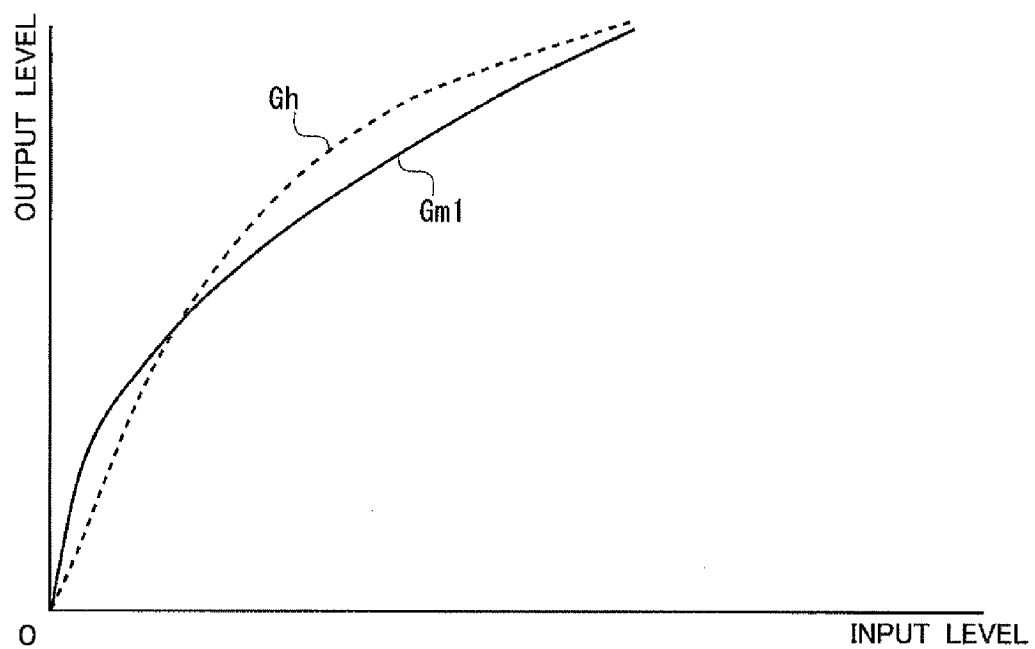
FIG. 9 is a diagram describing gradation curves.

Note that Gm1 in equation 30 to equation 32 corresponds to, for example, a gradation curve illustrated in FIG. 9. The gradation curve Gm1 is a gradation curve with an exponent of approximately 1/2.2 as illustrated in FIG. 9. Further, a gradation curve Gh in FIG. 9 is an example of a gradation curve generally used in conventional gradation conversion processing (a gradation curve having an S-shaped input/output characteristic in addition to an input/output characteristic based on gamma of the output destination).

In step S26, the controlling unit 17 performs gradation compression processing on the image data subjected to the first gradation conversion processing in step S25.

The controlling unit 17 first performs a low-pass operation on the image data subjected to the first gradation conversion processing in step S25. The low-pass operation is performed by following equation 33 and equation 34.

$$Y[x, y] = kr \cdot Rg[x, y] + kg \cdot Gg[x, y] + kb \cdot Bg[x, y] \quad \text{(equation 33)}$$

$$LY[x, y] = \sum_{i=-d}^{d} \sum_{j=-d}^{d} \left( Y[x+i, y+j] \cdot Lpw\left((i^2 + j^2)^{1/2}\right) \right) \quad \text{(equation 34)}$$

Note that kr, kg, kb in equation 33 are predetermined coefficients. With equation 33, a Y image out of YCbCr images is obtained from an sRGB image. Further, Lpw in equation 34 is a low-pass filter around pixels of interest, and this low-pass filter has a characteristic illustrated in FIG. 4 of the above-described embodiment. Then, from equation 34, image data of an LY image which is a low-pass image are generated from the Y image. Incidentally, the low-pass image is an example of a blurred image. Any other low-pass filter may be used to generate the low-pass image, or a method other than low-pass processing may be used to generate the blurred image.

Next, the controlling unit 17 performs gradation compression processing. The gradation compression processing is performed by following equation 35 to equation 37.

$$Rc[x,y]=Rg[x,y] \cdot fg(LY[x,y]) \quad \text{(equation 35)}$$

$$Gc[x,y]=Gg[x,y] \cdot fg(LY[x,y]) \quad \text{(equation 36)}$$

$$Bc[x,y]=Bg[x,y] \cdot fg(LY[x,y]) \quad \text{(equation 37)}$$

Note that fg in equation 35 to equation 37 is a parameter for gradation compression. The parameter for gradation compression is similar to that of FIG. 5 of the above-described embodiment. The parameter fg has a gain corresponding to image data of the LY image. The smaller the image data of the LY image (darker the range of the vicinity including processed pixels), the larger the parameter fg. Conversely, the larger the image data of the LY image (brighter the range of the vicinity including processed pixels), the closer the parameter fg to 1.

In step S27, the controlling unit 17 performs second gradation conversion processing on the image date subjected to the gradation compression processing in step S26. The second gradation conversion processing is performed by following equation 38 to equation 40.

$$Ro[x,y]=Gm2[Rc[x,y]] \quad \text{(equation 38)}$$

$$Go[x,y]=Gm2[Gc[x,y]] \quad \text{(equation 39)}$$

$$Bo[x,y]=Gm2[Bc[x,y]] \quad \text{(equation 40)}$$

Figure 10:
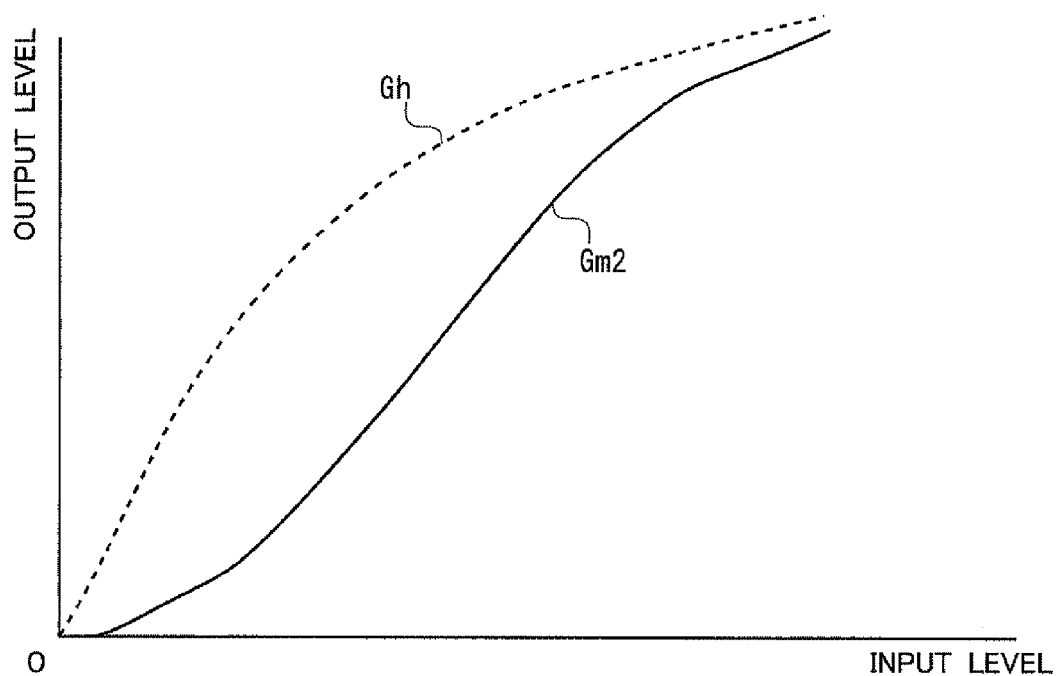
FIG. 10 is another diagram describing gradation curves.

Note that Gm2 in equation 38 to equation 40 corresponds to, for example, a gradation curve illustrated in FIG. 10. The gradation curve Gm2 is an S-shaped gradation curve as illustrated in FIG. 10. Performing the gradation conversion processing using such a gradation curve allows to improve the appearance of a final image. Further, a gradation curve Gh in FIG. 10 is an example of a gradation curve generally used in conventional gradation conversion processing (a gradation curve having an S-shaped input/output characteristic in addition to an input/output characteristic based on gamma of the output destination).

In step S28, the controlling unit 17 records the image data subjected to the second gradation conversion processing in step S27 in the memory card 28 via the card interface 25, and finishes the series of processing. In addition, before the image data are recorded in the memory card 28, image compression processing (such as JPEG compression processing) may be performed as necessary via the compression/extension part 26.

As described above, according to this embodiment, image processing including the gradation conversion processing complying to the input/output characteristic defined by the gradation curve formed only of an exponential component represented by $y=x^n$ (where x is an input and y is an output) is performed on image data, and then correction to improve the lightness of dark area gradation of the image data to which the image processing for the first time is performed. Finally, the gradation conversion processing for the second time complying to the input/output characteristic defined by a gradation curve different from the gradation curve in the gradation conversion processing for the first time is performed on the corrected image data. Conventionally, when correction to improve the lightness of dark area gradation is performed after gradation conversion processing using what is called an S-shaped gradation curve or the like, there has been a problem that a hue rotation, chroma change, or contrast change occurs locally due to the S-shaped gradation curve. According to this embodiment, it is possible to inhibit occurrence of such a hue rotation, chroma change, or contrast change during gradation compression.

A modification example of the above-described embodiment will be described below using the drawings.

In this modification example, an RGB image is converted into a YCbCr image before performing gradation compression processing, and gradation compression processing is performed on the YCbCr image.

Figure 11:
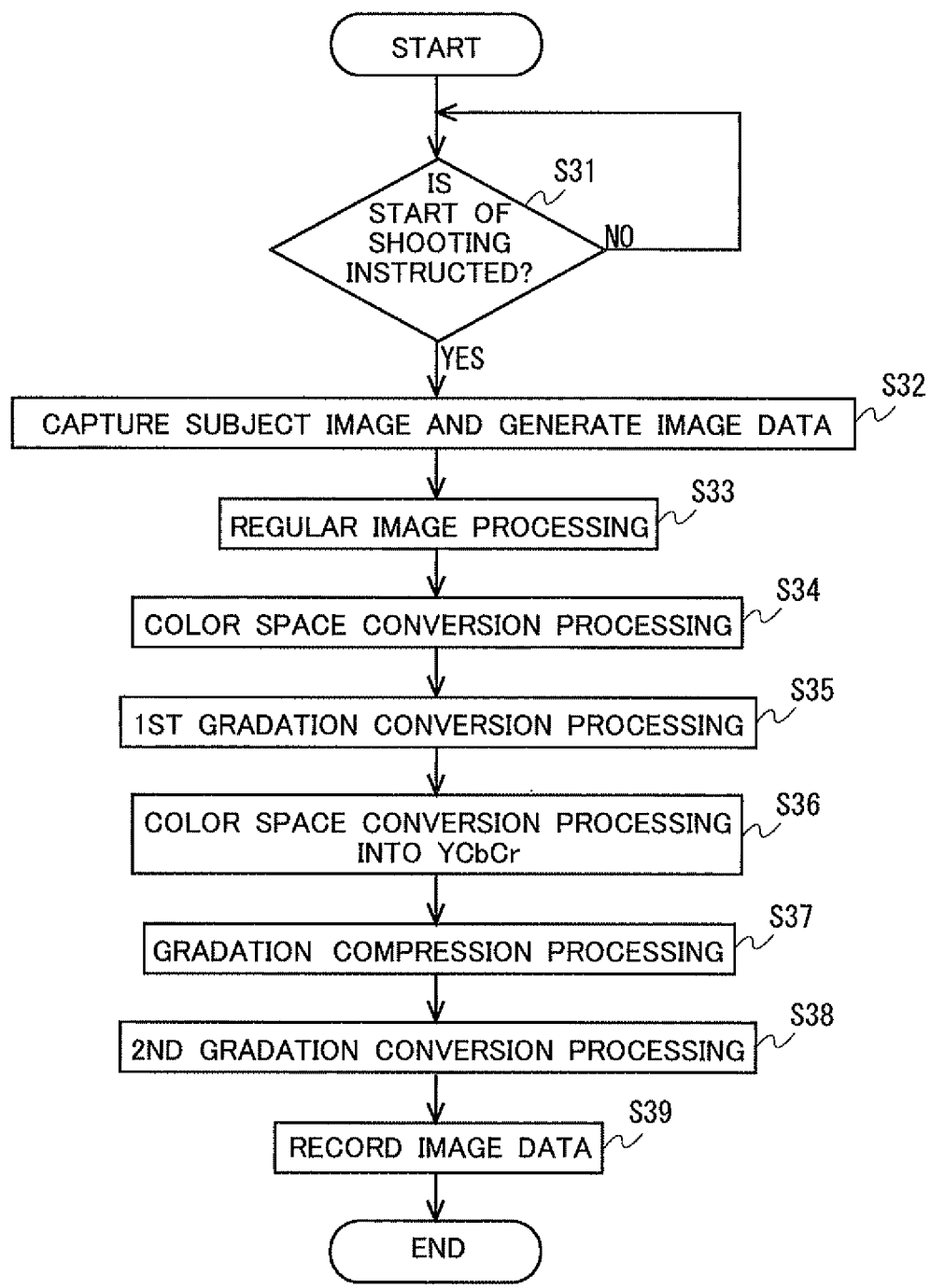
FIG. 11 is a flowchart illustrating operations for photographing in the electronic camera 1.

Operations for photographing when the gradation compression processing is performed on the YCbCr image will be described using the flowchart illustrated in FIG. 11.

Figure 8:
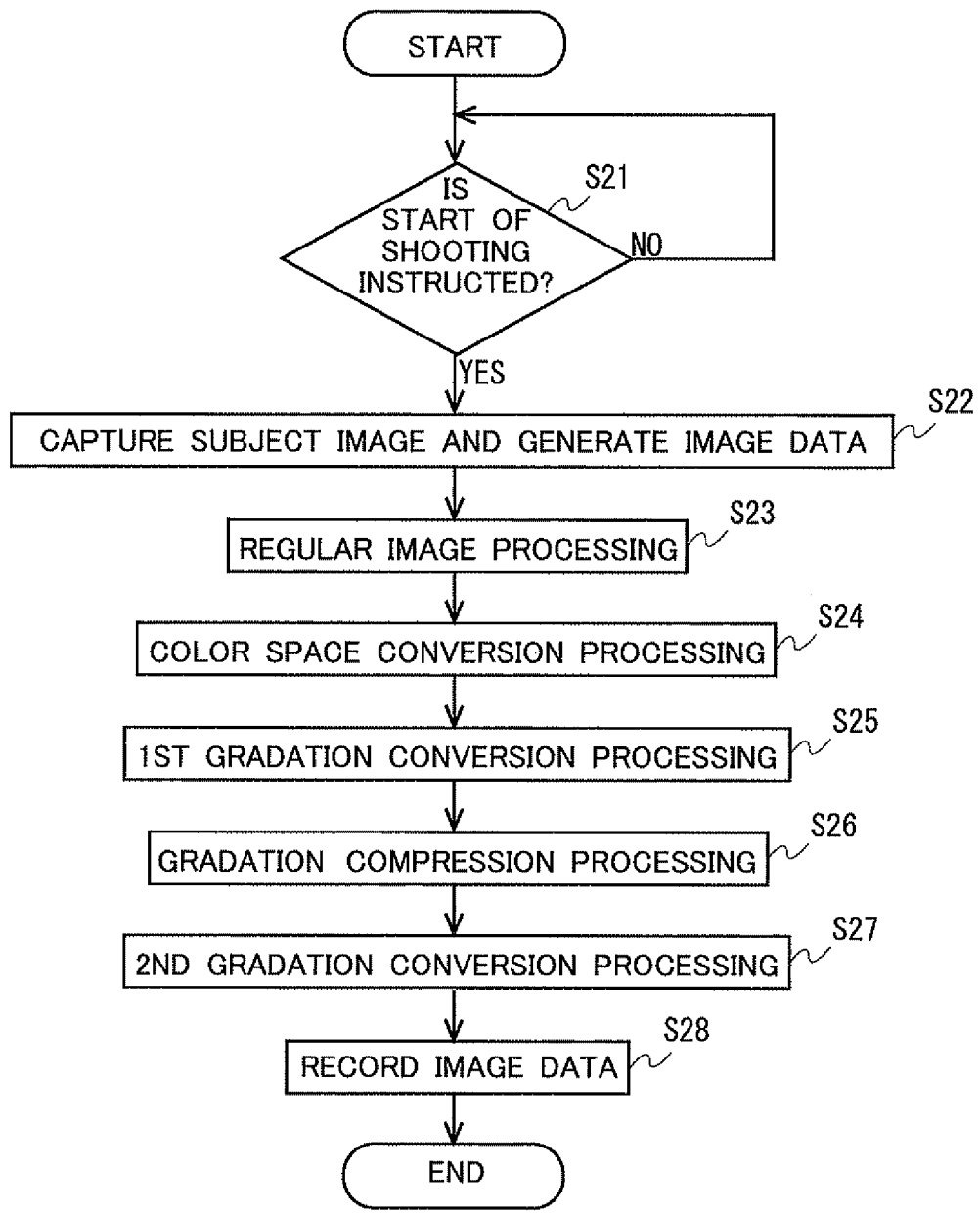
FIG. 8 is a flowchart illustrating operations for photographing in the electronic camera 1 of another embodiment.

From step S31 to step S35, the controlling unit 17 performs processing similar to that from step S21 to step S25 of FIG. 8 of the above-described embodiment.

In step S36, the controlling unit 17 performs color space conversion processing of the image data subjected to the first gradation conversion processing in step S35 into YCbCr. The color space conversion processing into YCbCr is performed by following equation 41 to equation 43.

$$Y[x,y]=my11 \cdot Rg[x,y]+my12 \cdot Gg[x,y]+my13 \cdot Bg[x,y] \quad \text{(equation 41)}$$

$$Cb[x,y]=my21 \cdot Rg[x,y]+my22 \cdot Gg[x,y]+my23 \cdot Bg[x,y] \quad \text{(equation 42)}$$

$$Cr[x,y]=my31 \cdot Rg[x,y]+my32 \cdot Gg[x,y]+my33 \cdot Bg[x,y] \quad \text{(equation 43)}$$

Note that each of my11 to my33 in equation 41 to equation 43 is a predetermined coefficient. With equation 41 to equation 43, the sRGB image is converted into the YCbCr image.

In step S37, the controlling unit 17 performs gradation compression processing on the image data subjected to the color space conversion processing in step S36.

The controlling unit 17 first performs a low-pass operation on the image data subjected to the color space conversion processing in step S36. The low-pass operation is performed by following equation 44.

$$LY[x, y] = \sum_{i=-d}^{d} \sum_{j=-d}^{d} \left(Y[x+i, y+j] \cdot Lpw\left((i^2 + j^2)^{1/2}\right)\right) \quad \text{(equation 44)}$$

Here, from equation 44, image data of an LY image which is a low-pass image are generated from a Y image out of YCbCr images. Further, Lpw in equation 44 is similar to that in FIG. 5 of the above-described embodiment. Incidentally, the low-pass image is an example of a blurred image. Any other low-pass filter may be used to generate the low-pass image, or a method other than low-pass processing may be used to generate the blurred image.

Next, the controlling unit 17 performs gradation compression processing. The gradation compression processing is performed by following equation 45 to equation 47.

$$Yc[x,y]=Y[x,y] \cdot fg(LY[x,y]) \quad \text{(equation 45)}$$

$$Cbo[x,y]=Cb[x,y] \cdot fg(LY[x,y]) \quad \text{(equation 46)}$$

$$Cro[x,y]=Cr[x,y] \cdot fg(LY[x,y]) \quad \text{(equation 47)}$$

Figure 5:
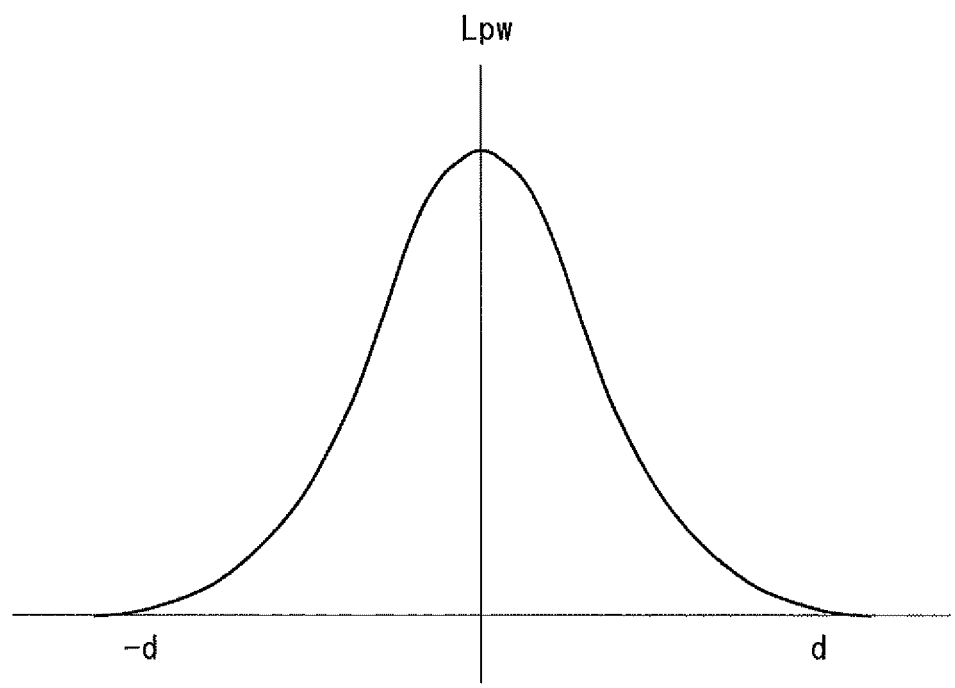
FIG. 5 is a diagram illustrating a low-pass filter.

Note that fg in equation 45 to equation 47 is similar to that in FIG. 5 of the above-described embodiment.

In step S38, the controlling unit 17 performs second gradation conversion processing on image data of a Y image indicating luminance out of the image data subjected to the gradation compression processing in step S37. The second gradation conversion processing is performed by following equation 48.

$$Yo[x,y]=Gm2[Yc[x,y]] \quad \text{(equation 48)}$$

Note that Gm2 in equation 48 corresponds to a gradation curve similar to that explained in step S27 of FIG. 8 of the above-described embodiment.

In step S39, the controlling unit 17 records the image data subjected to the second gradation conversion processing in step S38 in the memory card 28 via the card interface 25, and finishes the series of processing. In addition, before the image data are recorded in the memory card 28, image compression processing (such as JPEG compression processing) may be performed as necessary via the compression/extension part 26.

As described above, according to this modification example, the gradation conversion processing for the second time is performed only on the Y image data as luminance image data. Therefore, the calculation load can be reduced more than in the above-described embodiment, and the same effects as those in the above-described embodiment can be obtained.

Note that in the above-described embodiment and modification example, it is exemplified that the gradation conversion processing is performed using the gradation curve Gm1 illustrated in FIG. 9 (step S25 in FIG. 8 and step S35 in FIG. 9). However, the present invention is not limited to this example. A gradation curve other than the gradation curve Gm1 illustrated in FIG. 9 can be used to obtain the same effects as those of the present invention, as long as it is a gradation curve formed only of an exponential component represented by $y=x^n$ (where x is an input and y is an output). Although the gradation curve Gm1 with an exponent of approximately 1/2.2 based on monitor gamma in the sRGB color space is exemplified in FIG. 9, it may be a gradation curve with an exponent of 1/2 for example.

Another modification example of the above-described embodiment will be described below using the drawings.

Figure 12:
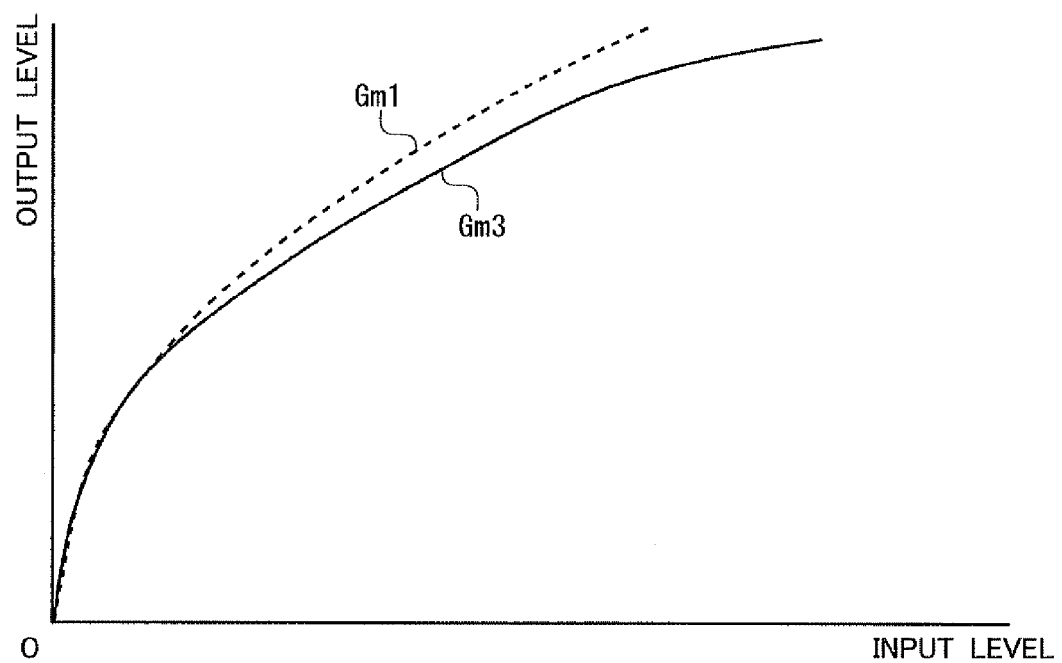
FIG. 12 is a diagram describing gradation curves.
Figure 13:
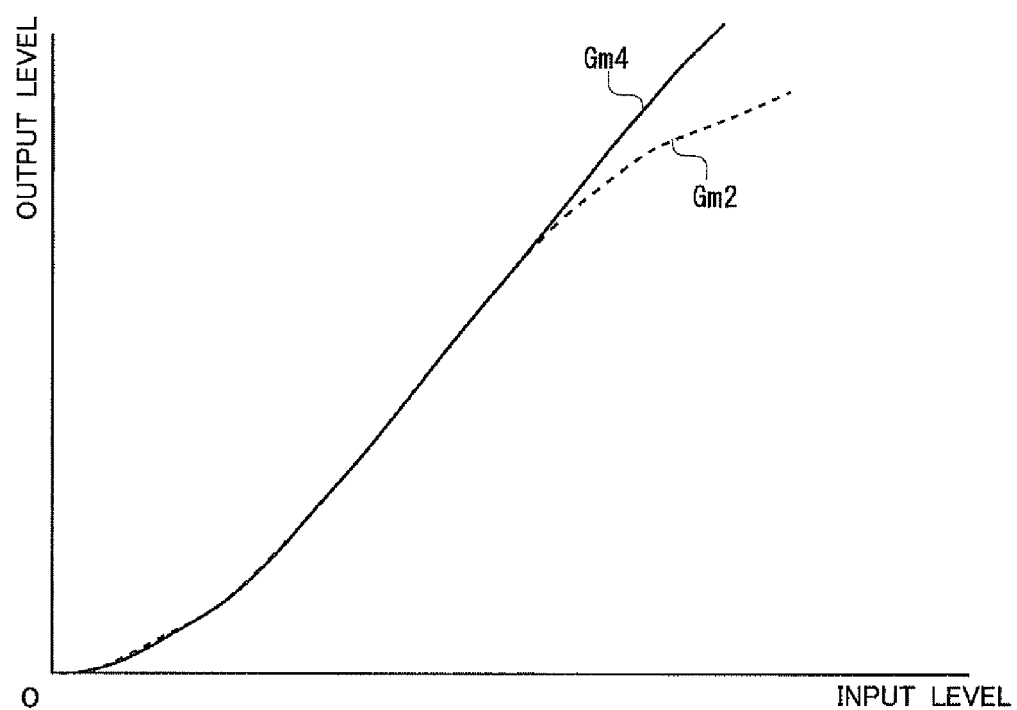
FIG. 13 is another diagram describing gradation curves.

In this modification example, a gradation curve Gm3 illustrated in FIG. 12 is used instead of the gradation curve Gm1 described in FIG. 9 of the above-described embodiment, and a gradation curve Gm4 illustrated in FIG. 13 is used instead of the gradation curve Gm2 described in FIG. 10 of the above-described embodiment.

Specifically, in the first gradation conversion processing described in step S25 of FIG. 8, the controlling unit 17 performs the gradation conversion processing using the gradation curve Gm3 illustrated in FIG. 12. The gradation curve Gm3 is a gradation curve in which only a part from a dark area to a middle tone is with an exponent of approximately 1/2.2 as illustrated in FIG. 12, and which has a characteristic (knee characteristic) of achieving a low output level with respect to the same level of input as compared to the gradation curve Gm1 on a bright part (highlight side). This is because improvement in lightness of dark area gradation due to the first gradation conversion processing is performed only in the part from a dark area to a middle tone. As a result, a change in the bright part can be made small by inhibiting occurrence of unexpected white saturation due to the first gradation conversion processing. Incidentally, in the gradation curve Gm3 illustrated in FIG. 12, a part having the characteristic of an exponent of approximately 1/2.2 is about 5% to 20% of the dark area, for example.

Further, in the second gradation conversion processing described in step S27 of FIG. 8, the controlling unit 17 performs the gradation conversion processing using the gradation curve Gm4 illustrated in FIG. 13. The gradation curve Gm4 has a characteristic such that the knee characteristic on the bright part (highlight side) is made weaker than that of the gradation curve Gm2 as illustrated in FIG. 13.

As described above, according to this modification example, image processing including the gradation conversion processing complying to the input/output characteristic defined by the gradation curve with at least a middle tone and a darker part being formed only of an exponential component represented by $y=x^n$ (where x is an input and y is an output) is performed on image data, and then correction to improve the lightness of dark area gradation of image data to which the image processing for the first time is performed. Finally, the gradation conversion processing for the second time complying to the input/output characteristic defined by a gradation curve different from the gradation curve in the gradation conversion processing for the first time is performed on the corrected image data. Therefore, the same effects as those of the above-described embodiment can be obtained.

Note that in this modification example, it is exemplified that the gradation conversion processing is performed using the gradation curve Gm3 illustrated in FIG. 12. However, the present invention is not limited to this example. The same effects as those of the present invention can be obtained even using a gradation curve other than the gradation curve Gm3 illustrated in FIG. 12 as long as it is a gradation curve with at least a middle tone and a darker part being formed only of an exponential component represented by $y=x^n$ (where x is an input and y is an output). For example, at least the middle tone or the darker part may be a gradation curve with an exponent of 1/2.

Further, the above-described embodiments and modification examples, it is exemplified that the technology of the present invention is achieved in the electronic camera 1. However, the present invention is not limited to this. For example, the present invention can be applied similarly to a compact-type electronic camera, a video camera for taking moving images, or the like.

Further, the image processing device described in the embodiments and the modification examples may be achieved in the form of software by a computer and an image processing program. In this case, a part or all of the processing in and after step S3 described in the flowchart of FIG. 3 may be achieved by a computer. Alternatively, a part or all of the processing in and after step S13 described in the flowchart of FIG. 7 may be achieved by a computer. For achievement by a computer, information or the like of whether it is in the gradation compression mode or not may be supplied to the computer together with image data. Such information can be supplied using EXIF information or the like of the image data.

Further, a part or all of the processing in and after step S23 described in the flowchart of FIG. 8 may be achieved by a computer. Moreover, a part or all of the processing in and after step S33 described in the flowchart of FIG. 11 may be achieved by a computer. For achievement by a computer, information or the like of whether it is in the gradation compression mode or not may be supplied to the computer together with image data. Such information can be supplied using EXIF information or the like of the image data. With such a structure, it is possible to carry out the same processing as those in the above-described embodiments and modification examples.

Furthermore, the above-described image processing program may be one stored in a computer readable storage medium, or may be one that is available via the Internet or the like.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing device, comprising:
an obtaining unit obtaining image data;
a low-pass processing unit performing a low-pass processing to an image data obtained by the obtaining unit to generate a low-pass image;
a calculating unit performing calculation for correction to improve lightness of dark area gradation of the image data by using the low pass image generated by the low-pass processing unit;
a correcting unit performing a correction to improve lightness of the dark area gradation of the image data based on a calculation result of the calculating unit;
a first image processing unit performing, on the image data obtained by the obtaining unit, image processing including gradation conversion processing according to an input/output characteristic defined by a gradation curve formed only of an exponential component represented by $y=x^n$, where x is an input and y is an output before the correcting unit performs the correction to improve lightness of the dark area gradation of the image data; and
a second image processing unit performing, on the image data, gradation conversion processing according to an input/output characteristic defined by a gradation curve which is different from the gradation curve in the first image processing unit and has an S-shaped characteristic after the correcting unit performed the correction to improve lightness of the dark area gradation of the image data.

2. The image processing device according to claim 1, wherein the correcting unit performs correction to improve lightness of the dark area gradation on each of R image data, G image data, and B image data based on the image data obtained by the obtaining unit.

3. The image processing device according to claim 1, wherein the correcting unit performs correction to improve lightness of the dark area gradation on each of Y image data, Cb image data, and Cr image data based on the image data obtained by the obtaining unit.

4. The image processing device according to claim 3, wherein the second image processing unit performs the gradation conversion processing only on Y image data on which correction to improve lightness of the dark area gradation is performed by the correcting unit.

5. An electronic camera, comprising:
   an imaging unit imaging a subject image and generating image data; and
   an image processing device according to claim 1, wherein the obtaining unit obtains the image data from the imaging unit.

6. An image processing device, comprising:
   an obtaining unit obtaining image data;
   a low-pass processing unit performing a low-pass processing to an image data obtained by the obtaining unit to generate a low-pass image;
   a calculating unit performing calculation for correction to improve lightness of dark area gradation of the image data by using the low-pass image generated by the low-pass processing unit;
   a correcting unit performing a correction to improve lightness of the dark area gradation of the image data based on a calculation result of the calculating unit;
   a first image processing unit performing. on the image data obtained by the obtaining unit, image processing including gradation conversion processing according to an input/output characteristic defined by a gradation curve with at least a middle tone and a darker part being formed only of an exponential component represented by $y = x^n$, where x is an input and y is an output before the correcting unit performs the correction to improve lightness of the dark area gradation of the image data: and
   a second image processing unit performing on the image data, gradation conversion processing according to an input/output characteristic defined by a gradation curve which is different from the gradation curve in the first image processing unit and has an S-shaped characteristic after the correcting unit performed the correction to improve lightness of the dark area gradation of the image data.

7. A computer readable non-transitory storage medium storing an image processing program for causing a computer to execute image processing on image data as an object to be processed, the image processing program comprising:
   an obtaining step obtaining the image data;
   a low-pass processing step performing a low-pass processing to an image data obtained by the obtaining step to generate a low-pass image:
   a calculating step performing calculation for correction to improve lightness of dark area gradation of the image data by image generated by low-pass processing step;
   a correcting step performing a correction to improve lightness of the dark area gradation of the image data based on a calculation result of the calculating step:
   a first image processing step performing, on the image data obtained by the obtaining step, image processing including gradation conversion processing according to an input/output characteristic defined by a gradation curve formed only of an exponential component represented by $y = x^n$, where x is an input and y is an output before the correcting step performs the correction to improve lightness of the dark area gradation of the image data; and
   a second image processing step performing on the image data gradation conversion processing according to an input/output characteristic defined by a gradation curve which is different from the gradation curve in the first image processing step and has an S-shaped characteristic after the correcting step performed the correction to improve lightness of the dark area gradation of the image data.

8. The computer readable non-transitory storage medium storing the image processing program according to claim 7, wherein in the correcting step, correction is performed to improve lightness of the dark area gradation on each of R image data, G image data, and B image data based on the image data obtained in the obtaining step.

9. The computer readable non-transitory storage medium storing the image processing program according to claim 7, wherein in the correcting step, correction is performed to improve lightness of the dark area gradation on each of Y image data, Cb image data, and Cr image data based on the image data obtained in the obtaining step.

10. The computer readable non-transitory storage medium storing the image processing program according to claim 9, wherein in the second image processing step, the gradation conversion processing is performed only on Y image data on which correction to improve lightness of the dark area gradation is performed in the correcting step.

* * * * *